3,779,977
THERMOSETTING NONAQUEOUS DISPERSION POLYMERS
Darrell D. Hicks, Jeffersontown, Ky., assignor to Celanese Coatings Company, New York, N.Y.
No Drawing. Continuation-in-part of abandoned application Ser. No. 751,026, Aug. 8, 1968. This application Aug. 4, 1971, Ser. No. 169,052
Int. Cl. C08c *11/22;* C08f *45/28*
U.S. Cl. 260—33.6 UA                          8 Claims

ABSTRACT OF THE DISCLOSURE

Heat curable coating compositions useful in primers and can coatings are made from a dispersion of an acrylonitrile copolymer in a liquid butadiene homopolymer or copolymer and an inert, relatively non-polar organic hydrocarbon liquid.

BACKGROUND OF THE INVENTION

This application is a continuation-in-part of application Ser. No. 751,026, filed Aug. 8, 1968, now abandoned.

Acrylic polymer dispersions have been made by grinding or precipitating preformed polymers in organic liquids and attempting to stabilize the resulting dispersions with conventional surface active agents. Such dispersions are not particularly stable and usually exhibit poor rheological properties. In U.S. Pat. 3,095,388 stable dispersions of acrylic polymers in organic liquids are described. These dispersions are made by polymerizing the acrylic monomers in the presence of rubber dissolved in an organic liquid in which the acrylic polymer is insoluble. As described in the patent a part of the acrylic monmer forms a block or graft copolymer with the rubber. The formed block or graft copolymer, part of which is soluble in the organic liquid and part of which is insoluble, stabilizes the dispersion of the acrylic polymer. The rubber is used in the amount of 0.1% to 10% by weight of the polymer to be dispersed. Paints made from the dispersions exhibit excellent coating properties. However, these paints are thermoplastic and as such have limited applicability for use as metal primers and as coatings for the interiors of metal cans.

SUMMARY OF THE INVENTION

This invention relates to heat curable, stable dispersions of acrylic copolymers and to the cured coatings obtained therefrom. In particular, the invention pertains to stable dispersions of acrylonitrile copolymers in inert organic liquids which contain dissolved therein as stabilizer at least 25 weight percent, based on the total weight of acrylonitrile copolymer and stabilizer, of a diene homopolymer or coplymer. Even more particularly, the invention relates to paint primer compositions and to can coating compositions.

The heat curable coating compositions of this invention are stable dispersions of (A) a solid copolymer of acrylonitrile and at least one monomer copolymerizable therewith dispersed in
(B) an inert volatile relatively non-polar organic liquid in which the copolymer (A) is substantially insoluble and at least partially grafted onto
(C) a diene homopolymer or copolymer containing at least 60 weight percent, based on the total weight of diene polymer, of polymerized diene monomer, having a molecular weight of about 1,000 to about 10,000, and being soluble in the inert organic liquid (B). The proportions of the film forming components of the dispersions, i.e., the solid copolymer components and the diene polymer, are 30–60 weight percent acrylonitrile, 10–30 weight percent comonomer and 25–50 weight percent diene polymer.

DESCRIPTION OF THE INVENTION

The monomers useful in preparing the solid dispersed copolymers of this invention are acrylonitrile in combination with at least one other monomer copolymerizable therewith. Such comonomers include esters of acrylic and methacrylic acid wherein the alcohol portion of the ester has 1 to 8 carbon atoms, nitriles of polymerizable acids other than acrylic, such as the nitriles of methacrylic and crotonic acids, amides of polymerizable acids, vinyl aromatic compounds and vinyl esters of saturated acids. Examples of such comonomers include methyl methacrylate, butyl methacrylate, methyl acrylate, ethyl acrylate, butyl acrylate, 2-ethylhexyl acrylate, methacrylonitrile, acrylamide, methacrylamide, crotonamide, styrene, vinyl toluene, alpha methyl styrene, chlorostyrene, vinyl acetate, vinyl propionate and the like.

Additional monomers are acrylic and methacrylic acid, 2-(1-aziridinyl)ethyl methacrylate, 1,1-dimethyl-1-(2,3-dihydroxypropyl)amine methacrylimide, 1,1-dimethyl-1-(2-hydroxypropyl)amine methacrylimide, trimethylamine methacrylimide, beta hydroxypropyl methacrylate, hydroxyethyl acrylate, butyl, hydroxypropyl maleate and ethyl, hydroxyethyl fumarate. The preferred comonomers are methacrylonitrile, methyl methacrylate, butyl methacrylate, ethyl acrylate and styrene. The most preferred comonomer is methyl methacrylate.

The diene polymers useful in this invention are homopolymers and copolymers containing at least 60% polymerized diene monomer. Such homopolymers and copolymers contain residual ethylenic unsaturated groups which are sufficiently reactive to enable some grafting to take place between the diene polymer and the monomers. In addition sufficient unsaturation remains after the dispersion is formed to enable films of the dispersions to be cross-linked and cured upon heating. Useful diene monomers are those which contain 4 to about 8 carbon atoms and 1 pair of conjugated double bonds. Examples of such monomers are butadiene, isoprene, chloroprene, 2,3-dimethylbutadiene, and the like. Useful comonomers polymerizable with the diene monomers are styrene, vinyltoluene, acrylonitrile, methacrylonitrile and the like. The preferred diene polymers are homopolymers of butadiene or copolymers of butadiene and styrene containing at least 60 weight percent and more preferably at least 75 weight percent butadiene. The useful diene polymers are those having molecular weight of 1,000 to 10,000 and preferably 2,000 to 5,000. Low molecular weight diene polymers of this type are generally made by cationic polymerization techniques using alkali metals or organometallics as the polymerization catalysts as described in U.S. Pat. 3,025,258. Diene polymers within the desired molecular weight range can also be made by well known latex polymerization techniques using a high level of chain terminators, e.g., mercaptans, to control the molecular weight. Low molecular weight diene polymers which contain hydroxyl substituents can be prepared by ozonolysis and cleaveage of high molecular weight synthetic and natural rubbers, as described in Journal of Polymer Science, Part A-1: Polymer Chemistry, vol. 6, p. 1037 (1968).

The inert, volatile, relatively non-polar organic liquids used as the dispersing and polymerizing media of this invention include any liquid hydrocarbon whether formed of a single compound or of a mixture of compounds, which are non-reactive under the conditions of polymerization. These hydrocarbons may be of aliphatic character, either acyclic or alicyclic, aromatic or naphthenic, or the polymerization medium may be made up of a mixture of these various types of hydrocarbons. Examples of individual hydrocarbons that may be used include pentane, n-hexane, cyclohexane, n-heptane, n-octane, iso-octane, benzene, toluene and ortho, meta and para xylene. Commercially available hydrocarbon mixtures may be employed such as mineral spirits, xylene mixtures, solvent naphthas of aromatic, aliphatic, or naphthenic character, alkyl benzenes in which the alkyl group or groups have from 1 to 4 carbon atoms, octane fractions which contain a mixture of octane isomers, etc. Generally, it is preferred to use a hydrocarbon liquid medium containing at least 50% by weight of non-aromatic components.

It is essential that the hydrocarbons be liquid, but they may have a wide boiling range, from a minimum of about 35° C. to a maximum of about 300° C. For most purposes the boiling range will be from about 100° C. to about 250° C.

The stable dispersions of this invention have a volatile portion which is the liquid hydrocarbon, and a non-volatile or film-forming portion which is the diene polymer and the copolymer of acrylonitrile and another monomer. The amounts of non-volatiles in these compositions can be varied quite widely between about 20% and 75% by weight but generally are from about 35 to about 50% by weight.

The proportions of the components utilized in the non-volatile or film-forming portion of the dispersions of the present invention generally are as follows: 25–50% by weight of diene homopolymer or copolymer, 30–60% by weight of acrylonitrile, and 10–30% by weight of other monomers, wherein (1) the use of an amount of diene homopolymer or copolymer less than about 25% results in decreased water resistance in the cured film; (2) the use of an amount of acrylonitrile less than about 30% also results in decreased water resistance in the cured film; (3) the use of an amount of diene homopolymer or copolymer greater than about 50% results in decreased dispersion stability as a result of increased dispersion solubility; and (4) the use of an amount of acrylonitrile greater than about 60% results in seediness in the dispersion and a lack of coalescence in film formation. The preferred ranges of the above components are 30–45% by weight diene polymer, 40–50% by weight acrylonitrile, and 15–25% by weight of other monomers.

The compositions of this invention can be made by a number of well known polymerization techniques using free-radical producing catalysts. Such methods include: (1) the addition of all components (monomers, diene polymer, liquid hydrocarbon and catalysts) to the reactor followed by heating to the reaction temperature; (2) slow addition of monomers to the heated flask containing the liquid hydrocarbon, diene polymer and catalysts; (3) same as (2) with the slow addition of catalyst also. A preferred method is to charge the monomers, diene polymer and liquid hydrocarbon to the reactor, heat the contents to 60–80° C. while keeping them under an inert gas blanket, slowly add the catalyst while maintaining the temperature and, after all the catalyst is added, raise the temperature to 85–100° C. and hold until complete conversion of monomers to polymer is obtained.

Useful polymerization catalysts are free radical producing catalysts, such as cumene hydroperoxide, t-butyl perbenzoate, methyl ethyl ketone peroxide and cyclohexanone peroxide. The preferred catalysts are those having half-lives at 85° C. of 0.2 to 5 hours. Examples of these catalysts are 2,4-dichlorobenzoyl peroxide, lauroyl peroxide, caprylyl peroxide, azobisisobutyronitrile, acetyl peroxide, benzoyl peroxide, p-chlorobenzoyl peroxide, t-butyl peroxy isobutryate and t-butyl peroctoate. The most preferred catalysts are azobisisobutyronitrile and t-butyl peroctoate.

Coating compositions made from the dispersions of this invention can be pigmented or unpigmented depending upon the particular end use. The coatings can be sprayed, brushed or applied by roller coating techniques. The coatings are cured by heating at temperatures of 150° C. to about 300° C. for a time sufficient to cross-link the film, generally about 1 to about 30 minutes. Coalescing aids, such as high boiling esters, alcohols, or aromatic solvents can be added in amounts up to about 15% by weight based upon the film-forming components.

The compositions of this invention have particular applicability for use as can coatings. Tin-free steel or steel which is electrolytically tin plated can be coated with these compositions by roller coating or other means. After the coatings are cured by heating at elevated temperatures, particularly 185 to 210° C., the coated steel can be formed into finished cans with no cracking, loss of adhesion or failure of the coatings.

The following examples illustrate in greater detail the preparation of the stable dispersion of this invention. Parts where used are parts by weight.

Example 1

To a suitable reactor were added 617.1 parts of acrylonitrile, 275.4 parts of methyl methacrylate, 1425 parts of mineral spirits and 382.5 parts of a homopolymer of butadiene, having an average molecular weight of about 3500, a viscosity at 30° C. of 200 poises, a hydroxyl content of 0.75 meg./gm. and an iodine number of 395. The reactor was flushed with nitrogen and a slow stream of nitrogen was maintained throughout the reaction. Heat was applied raising the temperature to 70° C. A solution of 6.40 parts of t-butyl peroctoate in 306 parts of mineral spirits was added to the reactor over a period of 150 minutes while holding the temperature at 70° C.±3° C. After all the catalyst solution was added, the temperature was held at 70° C. for 20 minutes, was then raised to 90° C. over a 30 minute period and was held at 90° C. for 3 hours to complete the polymerization. The flask contents were cooled to 40° C. and were strained through cheesecloth. The resulting stable dispersion had a solids content of 41.8% as determined by heating for 30 minutes at 200° C. on a cure plate, and a viscosity of 720 cps. at 25° C., using a Brookfield (Model RVF) viscosimeter, #2 spindle at 10 r.p.m.

Films were prepared on electrolytic tin plate using a 3 mil doctor blade. These films were cured by baking at 204° C. for six minutes. The films were well cured, had a pencil hardness of F–H, and exhibited excellent resistance to boiling water after 1 hour immersion with no loss in adhesion, flexibility and other film properties.

Example 2

Using the same procedure as was described in Example 1, 660.4 parts of acrylonitrile, 295.8 parts of methyl methacrylate and 318.8 parts of the polybutadiene described in Example 1 were dissolved in 1425 parts of mineral spirits. The reactants were heated to 70° C. and 6.35 parts of t-butyl peroctoate dissolved in 306.4 parts of mineral spirits were added over a period of 2 hours and 38 minutes. After all the catalyst solution had been added the temperature was held at 70° C. for 30 minutes and was then raised to 90° C. over a period of 49 minutes. The temperature was held at 90° C. for 2 hours and 48 minutes to complete the polymerization. The resulting dispersion had a solids content of 41.8% as determined by heating for 30 minutes on a cure plate. The Brookfield viscosity with a No. 1 spindle at 10 r.p.m. and at 25° C. was 265 cps.

Films on electrolytic tin plate were prepared from the dispersion using a 3 mil doctor blade. After heating for six minutes at 204° C., the films were well cured with a clear yellow appearance. They had good gloss, excellent mar resistance and good resistance to 1 hour in boiling water.

Example 3

Using the same procedure as described in Example 1, a non-aqueous dispersion was made from 76 parts acrylonitrile, 34 parts methyl methacrylate, and 90 parts of the polybutadiene described in Example 1 in 272 parts mineral spirits using 1 part of t-butyl peroctoate catalyst. The resulting product had a non-volatiles content of 37.5% as determined after 30 minutes at 200° C. on a cure plate, a Brookfield viscosity of 440 cps. using a #2 spindle at 10 r.p.m. and 25° C.

Films prepared on electrolytic tin plate with a 3 mil doctor blade were cured by heating at 204° C. for 6 minutes. The films were clear, yellow and smooth with excellent mar resistance and excellent boiling water resistance. The films passed a 28 inch-pound reverse impact test.

Example 4

Using the same procedure as described in Example 1, a non-aqueous dispersion was made from 50 parts methyl methacrylate, 80 parts acrylonitrile and 70 parts polybutadiene described in Example 1 dispersed in 300 parts of VM&P naphtha using 4 parts t-butyl peroctoate as catalyst. The product had a non-volatiles content of 40% as determined after 30 minutes heating on a cure plate at 200° C.

Films were prepared on steel panels using a 3 mil doctor blade and were baked for 20 minutes at 177° C. The well cured films exhibited good mar resistance and adhesion. The pencil hardness was 4H–5H and the films were unaffected after a 45 second spot soak with xylene.

Example 5

Using the procedure described in Example 1, a non-aqueous dispersion was made from 80 parts acrylonitrile, 50 parts methacrylonitrile and 70 parts of the polybutadiene described in Example 1, in 300 parts of mineral spirits using 2 parts of t-butyl peroctoate as catalyst. Films were drawn down on electrolytic tin plate using a 3 mil doctor blade. The films were well cured after a 6 minute bake at 204° C.

Example 6

A non-aqueous dispersion was made from 191.2 parts methyl methacrylate, 637.5 parts acrylonitrile and 446.3 parts polybutadiene described in Example 1 in 1725 parts mineral spirits with 6.35 parts t-butyl peroctoate catalyst. The procedure used was that described in Example 1. The dispersion had a non-volatiles content of 41.8% and a Brookfield viscosity at 23–25° C. of 460 cps. using #2 spindle at 10 r.p.m.

Films were roll coated on electrolytic tin plate and were baked at 204° C. for 10 minutes. After 1 hour immersion in boiling water the films exhibited good adhesion and excellent water resistance with no whitening or blushing.

Example 7

Using the same procedure described in Example 1, 155.7 parts of acrylonitrile, 69.3 parts of methyl methacrylate, and 25.0 parts of the polybutadiene described in Example 1 were reacted in 250 parts of mineral spirits using 1.25 parts of t-butyl peroctoate catalyst. The resulting dispersion had a solids content of 49.7% and a Brookfield viscosity at 26° C. using the No. 7 spindle at 10 r.p.m. was 12,000 cps.

30 parts of the dispersion were blended with 4.2 parts of the polybutadiene described above and 11.5 parts of mineral spirits. The blend had a solids content of 42.3% and a Brookfield viscosity at 25° C. with a No. 2 spindle at 10 r.p.m. of 452 cps.

Films of the blend were drawn down on electrolytic tinplate using a 3 mil doctor blade and were baked for 6 minutes at 204° C. The well cured films exhibited excellent mar resistance and adhesion to the substrate, they had a pencil hardness of HB–F and they passed a 28 inch-pound reverse impact test. After 1 hour in boiling water, the films had whitened somewhat at the film edges.

Example 8

To a suitable reactor equipped with a stirrer, thermometer, condenser and dropping funnel were added 863 parts of mineral spirits. To the dropping funnel was added a solution of 617.1 parts of acrylonitrile, 275.4 parts of methyl methacrylate, 382.5 parts of the polybutadiene described in Example 1, 6.4 parts of azobisisobutyronitrile and 863 parts of mineral spirits. Heat was applied raising the temperature of the mineral spirits in the reactor to 85° C. Slow addition of the reactants in the dropping funnel to the reactor was begun while keeping the temperature between 82° and 85° C. All the contents of the dropping funnel were added after four hours. The temperature was then held at 82° to 85° C. for 6 hours and 45 minutes to complete the polymerization.

The resulting stable dispersion had a solids content of 40.4% and a Brookfield viscosity of 60.5 cps. at 25° C. and as measured with a No. 2 spindle at 12 r.p.m.

Films prepared on electrolytic tin plate with a 3 mil doctor blade were well cured after six minutes heating at 204° C.

Example 9

The reactor of Example 1 was charged with 864.5 parts of methyl methacrylate, 465.5 parts of the polybutadiene described in Example 1, 2100 parts of VM&P naphtha, and 70.0 parts of cumene hydroperoxide. The contents of the reactor were heated to 95° C. and gradually over a period of about five hours the temperature was increased to 124° C.; the contents of the reactor were maintained at this temperature for about six hours. A milky white, polymeric dispersion resulted which exhibited a solids content of 37.0 weight percent and a Brookfield viscosity at 25° C. (#2 spindle, 10 r.p.m.) of 940 cps.

A film was prepared on electrolytic tin plate and evaluated, as described for Example 1. The film exhibited poor water resistance.

Example 10

The reactor of Example 1 was charged with 375.0 parts of mineral spirits, 100 parts of acrylonitrile, 50.0 parts of ethyl acrylate, 12.5 parts of maleic acid, and 9.4 parts of a 50% by weight solution of degraded rubber (Grade 75, DPR Division of H. V. Hardman Company) in mineral spirits. The mixture was agitated and heated to 75° C., under a nitrogen atmosphere; the maleic acid had not dissolved. To the reaction mixture was added 1.22 parts of benzoyl peroxide; heating and agitation were continued. As polymerization occurred, a very slight exotherm was observed. The temperature was maintained at about 75° C. by alternately raising and lowering the heating mantle as required. After about two hours, the initial almost-white dispersion had become a light-brown granular mass which was stirrable only in the vicinity of the agitator. After about 2¼ hours at about 75° C., the reaction mixture was cooled to room temperature by means of an ice-bath. Because of the nature of the mixture, no attempts at characterization were made.

Using a three-mil drawdown bar, a poor film was cast on an electrolytic tin plate panel and baked at 205° C. for six minutes. No coalescence occurred; a white, powdery residue resulted which could be wiped off of the panel.

Example 11

Using the apparatus of Example 1, the reactor was charged with 280 parts of mineral spirits, 112.5 parts of acrylonitrile, 112.5 parts of methyl methacrylate, and 25 parts of the polybutadiene employed in Example 1. The mixture was agitated and heated to about 70° C., under a nitrogen atomsphere; a pale yellow solution was obtained. A solution of 1.05 parts of t-butyl peroctoate in 59 parts of mineral spirits was added dropwise to the reaction solution over a period of 2.5 hours while maintaining the reaction temperature at about 70° C. As catalyst addition progressed, the reaction solution became increasingly turbid. After completing the addition of catalyst solution the reaction mixture was heated at about 70° C. for one hour, followed by three hours at about 90° C. The exothermic nature of the polymerization required some cooling initially. The resultant, moderately viscous dispersion was cooled and filtered through cheesecloth. The dispersion had a solids content of 41.7%.

Using a three-mil drawdown bar, a film was cast on an electrolytic tin plate panel and cured as described for Example 10. A smooth but discontinuous film was obtained. Although the film exhibited good adhesion and mar resistance, it failed a 28 inch-pound reverse impact test. After immersing the film in boiling water for one hour, the film had not softened but had whitened severely; the film did not recover upon standing.

It is to be understood that the foregoing detailed description is given merely by way of illustration and that many variations may be made therein without departing from the spirit of the invention.

The embodiments of this invention in which an exclusive property or privilege is claimed are defined as follows:

1. A heat curable coating composition comprising a stable dispersion of
    (A) a solid copolymer of acrylonitrile and at least one other monomer copolymerizable therewith dispersed in
    (B) an inert relatively non-polar organic hydrocarbon liquid in which the copolymer (A) is insoluble and at least partially grafted onto
    (C) a diene homopolymer or copolymer containing 60–100 weight percent polymerized diene monomer and 0–40 weight percent copolymerized monomer and having a molecular weight of 1,000 to 10,000, and being soluble in the organic hydrocarbon liquid (B), wherein the components of (A) and (C) based on the total weight of (A) and (C) are in the amounts of 0–60 weight percent acrylonitrile
10–30 weight percent comonomer and
25–50 weight percent diene homopolymer or copolymer.

2. The composition of claim 1 wherein the monomer copolymerizable with acrylonitrile is methyl methacrylate, and the diene polymer is a homopolymer of butadiene.

3. The composition of claim 1 wherein the diene homopolymer or copolymer has a molecular weight of 2,000 to 5,000.

4. The composition of claim 1 wherein the components of (A) and (C) based on the total weight of (A) and (C) are in the amounts of 40–50 weight percent acrylonitrile, 15–25 weight percent comonomer and 30–45 weight percent diene homopolymer or copolymer.

5. The composition of claim 4 wherein the monomer copolymerizable with acrylonitrile is methyl methacrylate, and the diene polymer is a homopolymer of butadiene.

6. The composition of claim 5 wherein the homopolymer of butadiene has a molecular weight of 2,000 to 5,000.

7. The composition of claim 5 wherein the inert relatively non-polar organic hydrocarbon liquid is mineral spirits.

8. A metal can the interior of which is coated with the cured composition of claim 1.

References Cited

UNITED STATES PATENTS 3,095,388    6/1963    Osmond et al. __ 260—33.6 UA
3,218,287    11/1965    Schmidle et al. __ 260—33.6 UA

OTHER REFERENCES

Hofmann: Vulcanization and Vulcanizing Agents (Palmerton) (N.Y.) (1967) (translated from 1965 German ed.), pp. 26–27.

MORRIS LIEBMAN, Primary Examiner

H. H. FLETCHER, Assistant Examiner

U.S. Cl. X.R.

260—31.2 MR, 33.4 R, 33.6 A, 34.2, 41.5 R

UNITED STATES PATENT OFFICE
CERTIFICATE OF CORRECTION

Patent No. 3,779,977     Dated December 18, 1973

Inventor(s) Darrell D. Hicks

It is certified that error appears in the above-identified patent and that said Letters Patent are hereby corrected as shown below:

In column 1, line 33, delete "monmer" and insert -- monomer --.
In column 7, line 41, delete "0-60" and insert -- 30-60 --.

Signed and sealed this 9th day of April 1974.

(SEAL)
Attest:

EDWARD M. FLETCHER, JR.
Attesting Officer

C. MARSHALL DANN
Commissioner of Patents